United States Patent [19]
Takahara et al.

[11] Patent Number: 5,229,694
[45] Date of Patent: Jul. 20, 1993

[54] METHOD AND DEVICE FOR CONTROLLING HEADREST, AND DRIVE MECHANISM THE HEADREST

[75] Inventors: Masatoshi Takahara; Masaaki Yokota; Hiromitsu Ogasawara, all of Akishima, Japan

[73] Assignee: Tachi-S Co., Ltd., Akishin, Japan

[21] Appl. No.: 780,631

[22] Filed: Oct. 23, 1991

[30] Foreign Application Priority Data

Oct. 31, 1990 [JP] Japan .................................. 2-2292446

[51] Int. Cl.$^5$ .............................................. B60N 2/02
[52] U.S. Cl. ................................... 318/265; 318/286; 318/434; 318/469
[58] Field of Search ............... 318/255, 256, 264, 265, 318/266, 280, 282, 283, 286, 430, 434, 466, 467, 468, 469, 567, 568.1; 307/9.1, 10.1; 297/391

[56] References Cited

U.S. PATENT DOCUMENTS

| | | | |
|---|---|---|---|
| 4,797,824 | 1/1989 | Sugiyama et al. | 364/424.05 |
| 4,935,680 | 6/1990 | Sugiyama . | |
| 4,977,973 | 12/1990 | Takizawa | 180/271 |
| 5,003,240 | 3/1991 | Ikeda | 318/603 |
| 5,006,771 | 4/1991 | Ogasawara | 318/568.1 |
| 5,095,257 | 3/1992 | Ikeda et al. | 318/568.1 |
| 5,105,132 | 4/1992 | Sakamoto et al. | 318/434 |

Primary Examiner—Bentsu Ro
Attorney, Agent, or Firm—Oldham, Oldham & Wilson Co.

[57] ABSTRACT

A method and device for controlling a headrest, as well as a headrest drive mechanism, wherein the headrest is to be controlled so as to cause the same to automatically return to the use position if it disposed and stopped between an intermediate position and use position.

5 Claims, 10 Drawing Sheets

METHOD AND DEVICE FOR CONTROLLING HEADREST, AND DRIVE MECHANISM THE HEADREST

BACKGROUND OF THE INVENTION

1. Field of the Invention

The present invention relates to a headrest, and in particular, relates to a method and device for controlling the headrest as well as a drive mechanism for the headrest in which a motor is controlled its drive so as to control a displacement of the headrest between a use position and non-use position.

2. Description of Prior Art

There has been known a movable headrest displaceable between its erecting use position and lowered non-use position, by which an occupant's head may be normally supported at the use position and otherwise the headrest per se may be moved down to the non-use position for avoiding hindrance to a vision field of another occupant on another seat.

Such headrest, conventionally, has been coupled to a drive mechanism via a one link within a seat, which is typically known from U.S. Pat. application Ser. No. 686,189 assigned to the same assignee of the present invention. According thereto, a pair of stays of headrest are secured on a rotatable shaft disposed within a seat back, and a connecting rod is at its one end connected pivotally to a link piece extending orthogonally from the rotatable shaft. Another end of the connecting rod is formed with a rack gear part which is in mesh with a pinion of a drive mechanism including a motor. Actuating the motor causes the connecting rod to move vertically through the pinion-and-rack gear transmission, which in turn causes the link piece to rotate simultaneously likewise about the axis of the rotatable shaft. Then the shaft is rotated to displace the headrest between the use and non-use positions. This permits for controlling the motion of headrest and adjusting its desired positions between the use and non-use positions.

In this sort of headrest construction, as can be seen from the U.S. Pat. application Ser. No. 686,189, typically, the drive mechanism and connecting rod are disposed adjacent to one of both lateral sides of seat back, and as such, no control mechanism is provided at another opposite side of seat back, which means that the control drive force is only imparted to one lateral side of the rotatable shaft connected to the headrest body. Such one-side control or what can be described as cantilever-like transmission has been found defective in that (i) a sudden great load applied to the headrest in a collision case is too intensively exerted on a free side of rotatable shaft which is relatively week as opposed to the foregoing control side of same shaft to which the connecting rod is connected, thus raising a high likelihood of the shaft being twisted and deformed, in which case, the headrest is also twisted, impairing the appearance of seat, and (ii) a slightly loosen engagement between the pinion and rack gears, which is needed in design for absorbing a variation in angle of mesh between them during vertical translation of the connecting rod, will easily tend to create a slight wobbling in the two gears and such wobbling will be transmitted, when the headrest is at the non-use position, to the headrest body, with an amplified magnitude, through the connecting rod, link piece and shaft which form a leverage serving to transform the slight wobbling into a corresponding larger rotative motions of the stays relative to the shaft forming a fulcrum, thus wobbling the headrest with an unpleasant contact noise, which may give an unstable psychological state to an occupant on the seat, dispersing his or her concentration for driving the car.

SUMMARY OF THE INVENTION

In view of the above-stated drawbacks, it is therefore a first purpose of the present invention to provide an improved arrangement of a headrest in a seat which prevents a wobbling of a headrest in its non-use position.

In order to achieve this purpose, in accordance with the invention, in such headrest construction wherein a drive mechanism is disposed only at one side of a seat back frame, the arrangement is characterized in comprising: a crank-like shaft rotatably supported at the upper part of the seat back frame, a stopper means provided fixedly at another free end part of the shaft which is disposed at another side of seat back frame where such drive mechanism is not present, a bearing bracket fixed on such another side of seat back frame, on which bearing bracket is rotatably supported foregoing another free end part of shaft, and an elastic means provided fixedly in the bearing bracket such as to resiliently receive one side surface of the stopper means when the headrest is located at the non-use position, wherein the headrest at the non-use position is supported stably by virtue of the drive mechanism at one side of seat back frame and both stopper and elastic means at another side thereof.

Accordingly, the headrest is supported in a bilateral manner instead of prior art cantilever-like one side support structure, thereby providing a robust headrest arrangement, and since the stopper means is contacted with the elastic means in a resilient way, it is possible to suppress the unpleasant noise and further to absorb a wobbling in the constituent elements of the drive mechanism (e.g. rack and gear mechanism).

It is a second purpose of the invention to prevent the headrest and shaft against twisting deformation.

To this end, in addition to the above-stated arrangement, the drive mechanism includes a link member fixed to the foregoing one end part of shaft and another bearing bracket fixed on the foregoing one lateral side of seat back frame, such that the link member is to be contacted with another elastic means provided in such another bearing bracket.

DETAILED DESCRIPTION OF PREFERRED EMBODIMENT OF THE INVENTION

Figure 1:
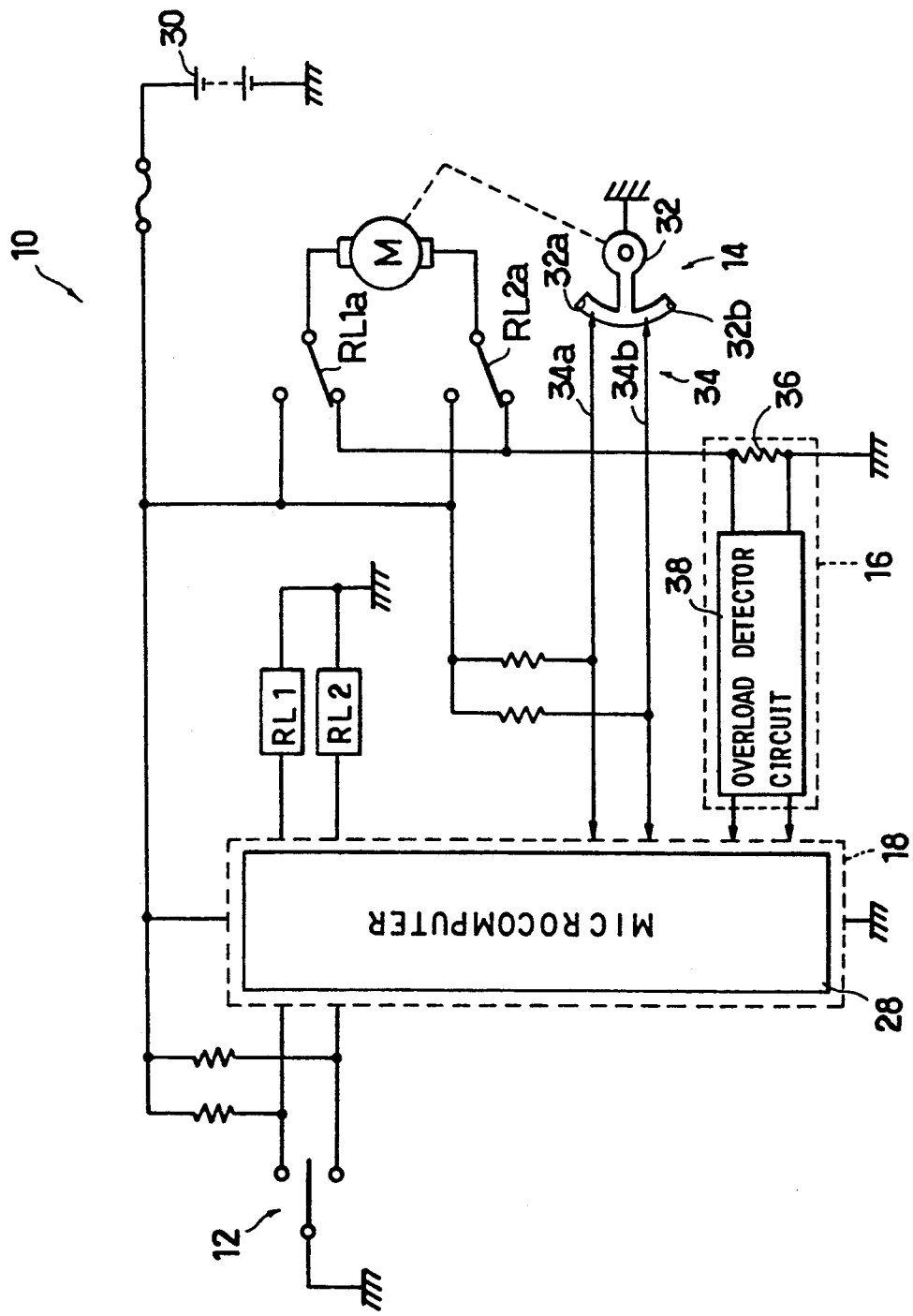
FIG. 1 is a schematic block diagram of a headrest control device in accordance with the present invention, which is controlled by a central processing unit.
Figure 2:
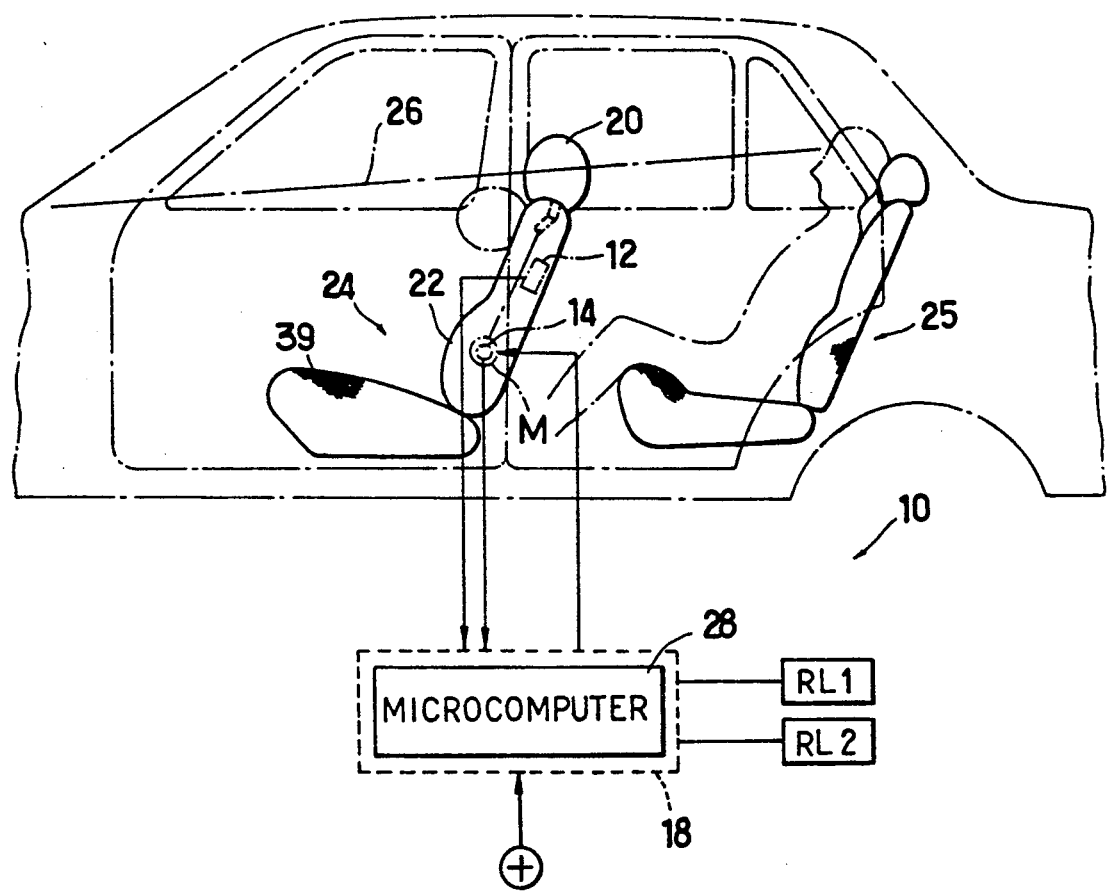
FIG. 2 is a schematic block diagram of the same headrest control device as applied to an assistant seat.

Referring to FIGS. 1 and 2, there is shown a headrest control device (10) which basically comprises an operation switch (12), a headrest position detector (14), an overload detection device (16), a central processing unit (18), relays (RL1, RL2, RL1a, RL2a) and a motor (M). According thereto, briefly stated, a headrest (20) may be rotatatively displaced forwardly and backwardly relative to a seat back (22) through control for normal or reverse drive of the motor (M). Preferably, the motor (M) is a DC geared motor having a limit switch built therein.

Figure 3:
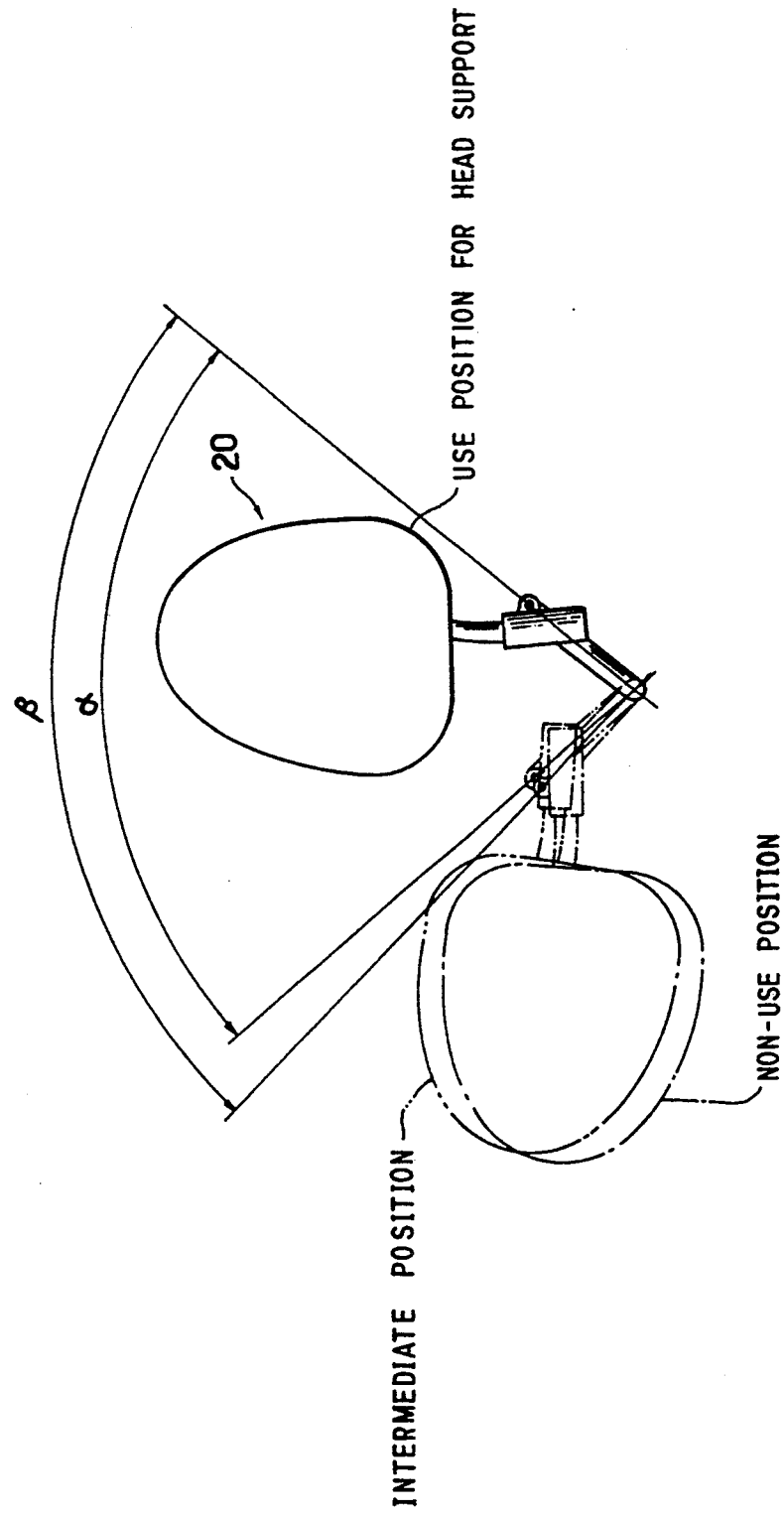
FIG. 3 is an explanatory diagram showing the motions of a headrest.

As shown in FIG. 2, the headrest (20) is disposed upon the top of seat back (22) of an assistant's seat (24), and displaceable between a use position indicated by the solid line and a non-use position indicated by the one-dot chain line in FIG. 3.

Referring back to FIG. 1, the operation switch (12) is a self-return, seesaw-type switch having a neutral off position and two switch positions defined on the opposite sides of the neutral off position, by which the motor (M) can be changed over its drive direction in one of normal and reverse directions. The switch (12) is electrically connected with the central processing unit (18) which will be referred to as "CPU" hereinafter.

The CPU (18) includes a microcomputer (28) which processes an input data properly according to a given program stored in memory so as to output a suitable control signal to the relays (RL1, RL2) connected to the CPU (18), whereby the relays are energized or deenergized to effect change-over of corresponding relay contact (RL1a)(RL1a) for driving or ceasing the motor (M). The CPU (18) and motor (M) are connected electrically to a battery (30) provided in the automobile.

With such arrangement, for example, turning on the switch (12) on for headrest non-use position will output a signal into the CPU (18), and then CPU (18) will output a control signal to energize the second relay (RL2) for changing over the associated rely contact (RL2a), thereby causing the motor (M) to drive in a normal direction to cause the headrest (20) to be displaced down toward the non-use position (see FIG. 3) Reversely, turning on the switch (12) for headrest use position will likewise actuate the CPU (18) to energized the first relay (RL1) for changing over the associated relay contact (RL1a), thereby causing the motor (M) to drive in a reverse direction to cause the headrest (20) to be displaced up toward the use position (see FIG. 3).

As clearly shown in FIG. 3, the position of the headrest (20) is defined as a non-use position indicated by one-dot chain line, an intermediate position indicated by two-dot chain line, and a use position indicated by the solid line. Preferably, with the use position being set as a reference point, the displaceable angle ($\lambda$) range of headrest (20) between the use and intermediate positions may be at about 80 degrees, and that ($\beta$) of same headrest between the use and non-use positions may be at about 85 degrees.

The position of headrest (20) is detected by the headrest position detector (14). In the embodiment shown, the detector (14) is a limit switch incorporated within the motor (M). The limit switch (14) includes an arcuate movable contact (32) operatively connected with an output shaft (not shown) of the motor (M) and a detection terminal (34) composed of a pair of first and second detection terminals (34a)(34b). With this limit switch (14), "on" signal is to be output when the headrest (20) is located within the displaceable angle range ($\alpha$), or "off" signal is to be output when the headrest (20) is located within the displaceable angle range ($\beta$).

For example, when the movable contact (32) is rotated in response to a reverse drive of motor (M) and the first terminal (32a) of movable contact (32) is brought to contact with the first detection terminal (34a), the "on" signal being input to the CPU (18) is changed into "off" signal, and then the CPU (18) determines the headrest (20) to be located at a point in the use position, outputting a control signal to deenergize the first relay (RL1) for changing over the corresponding relay contact (RL1a) to cease drive of the motor (M). In this way, the use position of the headrest (20) is set. On the other hand, when the movable contact (32) is rotated responsive to a normal drive of motor (M) and the second terminal (32b) is brought to contact with the second detection terminal (34b), the "off" signal is output to the CPU (18), and then the CPU (18) determines the intermediate position of headrest (20). This arrangement is only adapted to detect the intermediate of headrest (20), and therefore, irrespective of the headrest (20) reaching the intermediate position, the motor (M) continues its normal drive without stop.

The overload detection device (16) includes an overcurrent detection resistance (36) connected in series with the motor (M) and an overload detector circuit (38) which is interposed between and connected with the resistance (36) and CPU (18). The overload detection detector circuit (38) checks a terminal voltage of the resistance (36) against a preset reference value. If such terminal voltage exceeds over the reference value, the circuit (38) will output a signal to the CPU (18). Accordingly, in the case where the motor (M) is forcibly stopped due to a certain physical interference against the movement of headrest (20), the motor torque is increased to raise the terminal voltage of the overcurrent detection resistance (36), and if that terminal voltage reaches the reference value, the overload detector circuit (38) will output a signal to the CPU (18) and then the CPU (18) will deenergize the relay (RL1) immediately to stop the motor (M). Thus, the motor (M) is protected against over-current, overheat and damages. This overload detection device (16) is utilized for stopping the headrest (20) at each of the use, non-use and intermediate positions by use of corresponding stoppers which physically limit the drive of motor (M) for actuating the device (16).

According to the control device (10), the CPU (18) is so programed that, if the overload state of motor (M) is detected in the course of the headrest (20) being moved towards the non-use position, and further if the headrest (20) is being moved in the range between the use and intermediate positions, then the motor (M) is driven in reverse direction to automatically return the headrest (20) to the use position. In addition thereto, the CPU (18) is also programmed such that, if the overload state of motor (M) is detected in the course of the headrest (20) being moved towards the use position, with the headrest (20) being moved in the range between the intermediate and non-use positions, the motor (M) is immediately ceased its drive so as to stop the movement of headrest (20) on the spot, keeping the headrest (20) unmoved. In this respect, it is noted that such range between the intermediate and non-use positions is determined by the CPU (18) as the non-use position, and therefore the headrest (20), which is blocked its movement forcibly due to a physical interference by such as a baggage or part of person's body, within that particular point of position, may be stopped on the spot as a non-use position.

Furthermore, according to the present invention, it is so arranged that, if the overload state of motor (M) is detected during movement of the headrest (20) from the non-use position to the intermediate position, the CPU (18) instructs the motor (M) to stop its drive immediately, by determining the headrest (20) to be within the non-use position. This is important because in this case a physical interference exists between the intermediate and use positions and there is no need to automatically return the headrest (20) to the use position. In this way, in the case that the interference is a part of persons's body, the headrest (20) will not keep pressing against it so as to prevent his or her injury, or if the interference is a bag or something like that, such arrangement make it easy to remove it from between the headrest (20) and seat back.

Figure 4:
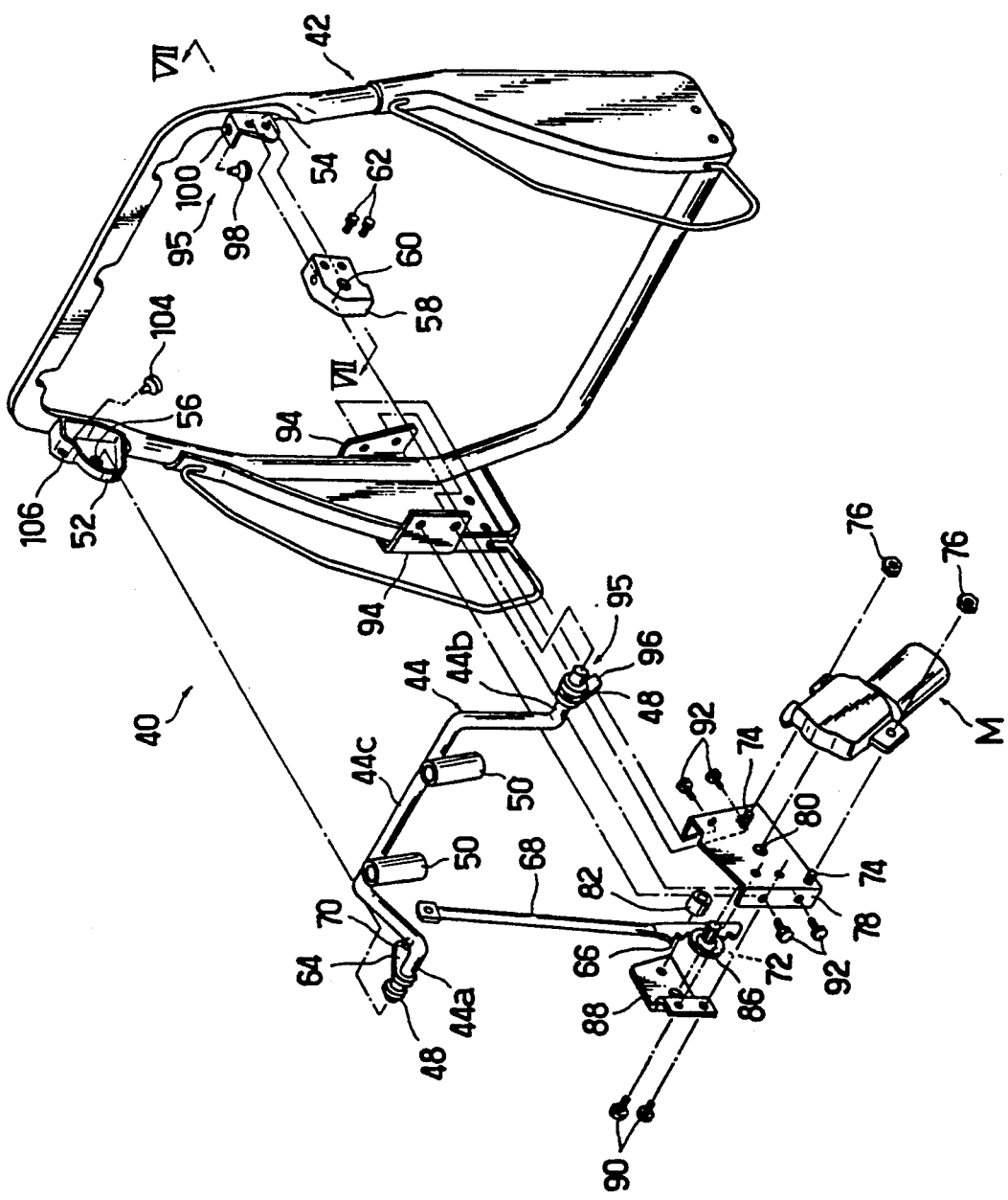
FIG. 4 is an exploded perspective view of a drive mechanism and frameworks associated with the headrest control device.

The headrest (20), as in FIG. 4, is coupled via a pair of stays (46) fast to a shaft (44) disposed at the upper frame section of seat back frame (42).

Figure 5:
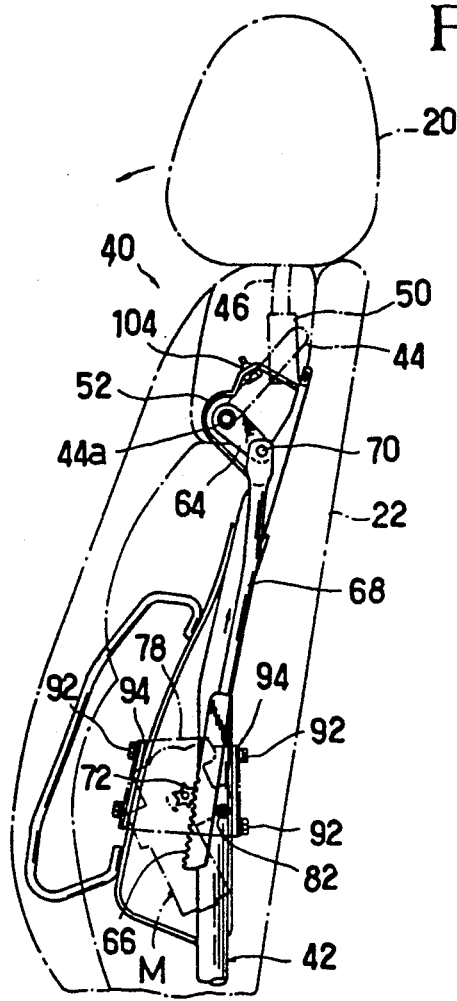
FIG. 5 is a schematic, longitudinally sectional view of the drive mechanism, showing a state where the headrest is located at a use position.

Viewing now FIG. 4, the shaft (44) is formed by bending a straight tube material into a crank shape, having ends (44a)(44b) defined in a coaxial relation with each other. A pair of spaced-apart of stay holders (50) are welded to the crank section (44c) of shaft (44), and a stopper ring (48) is provided at each of those ends (44a)(44b). FIG. 5 shows the headrest stays (20) as having been inserted in the respective stay holders (50), thus indicating the state of the headrest (20) being mounted upon the shaft (44).

As viewed particularly from FIG. 4, fixed integrally to the upper part of left-side frame section of seat back frame (42), is a first bearing bracket (52), whereas fixed likewise to the upper part of right-side section of same frame (42), is a mounting bracket (58). In this respect, as understandable from FIG. 4, firstly the end (44a) of shaft (44) is inserted through the hole (56) of first bearing bracket (52) and then, the other end (44b) of same shaft is inserted through the hole (60) of bearing member (58). Thereafter, the bearing member (58) is fastened to the mounting bracket (54) by means of securing screws (62). By being such constructed, the shaft (44) is free to rotate about an axis extending through the two ends (44a)(44b), so that rotation of shaft (44) will cause fore-and-aft rotative movement of headrest (16) via the crank section (44c) of shaft (44) in relation to the seat back (22).

As a drive mechanism, as can be seen from FIGS. 4 and 5, there are provided a motor (M) of DC geared type, a pinion gear (72) connected to the motor (M) and a connecting rod (68) having a rack gear part (66) formed at the lower portion thereof, wherein the pinion gear (72) is in mesh with the rack gear part (66). Specifically, the motor (12) is mounted fast on the motor bracket (78) by way of fastening nuts (76) to screws (74) projected from the motor bracket (78). The pinion gear (72) is connected through a hole (80) of motor bracket (78) to an output shaft (not shown) of the motor (M). An elastic member (82) made of an urethane rubber or the like is provided in the motor bracket (78) in order to resiliently support the straight rear edge of lower rack part (66) of the connecting rod (68) (See FIG. 5). A rack guide bracket (88) is fixed by screws (90) to the motor bracket (78), thereby housing and supporting the pinion and rack gears (72) (66) therein. Thus-assembled motor bracket (78) is fixed to a support bracket (94) by means of screws (92), which support bracket (94) is fixed to the lower part of left-side section of seat back frame (42).

As shown, a link piece (64) is fixed integrally to the left-side end (44a) of shaft (44), projecting therefrom in a direction orthogonal to the axis of that end (44a). To the free end of such link piece (64), the upper end of connecting rod (68) is connected pivotally by means of a pin (70).

Figure 7:
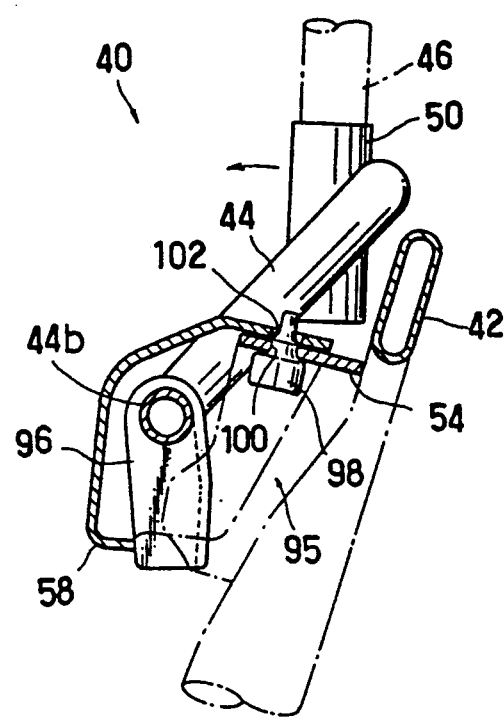
FIG. 7 is a sectional view taken along the line VII—VII in FIG. 4.

Now, reference is made to FIGS. 4 and 7. In accordance with the present invention, there is provided a stopper member (96) on the left-side end (44b) of shaft (44) where no foregoing drive mechanism) is arranged. As best shown in FIG. 7, the stopper member (96) is fixed at its base end part to the end (44b) of shaft (44), extending therefrom in a direction orthogonal to the axis thereof.

The second bearing bracket (58) has, formed at its lower side, a detent edge for limiting the downward rotation of the foregoing stopper member (96): Namely, one contact edge of the stopper member (96) comes to contact with such detent edge when the headrest (20) reaches at the given use position, whereupon the headrest (20) is located and retained at the use position against further backward movement.

Figure 8:
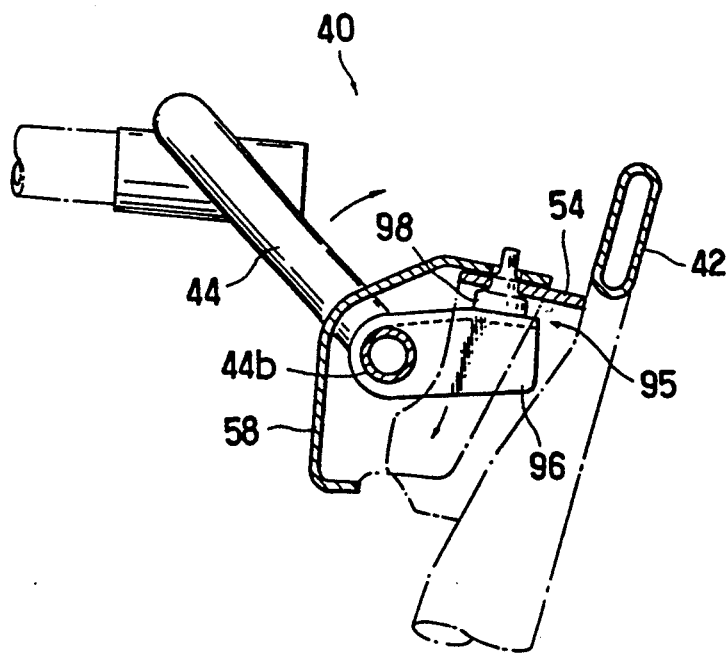
FIG. 8 is a sectional view similar to that in FIG. 7, which indicate the state where the headrest is located at the non-use position.

An elastic member (98) is fit inserted through two juxtaposed holes (100)(102) and fixed there. Like the foregoing dent edge of bearing bracket (58), the elastic member (98) is so adapted that another contact edge of stopper member (96) is brought to contact with the elastic member (98) when the headset (20) reaches the non-use position as shown in FIG. 8. Hence, the headrest (20) is limited its downward movement by the elastic member (98) and stopped at the non-use position. The elastic member is made of an urethane rubber material or the like.

Figure 6:
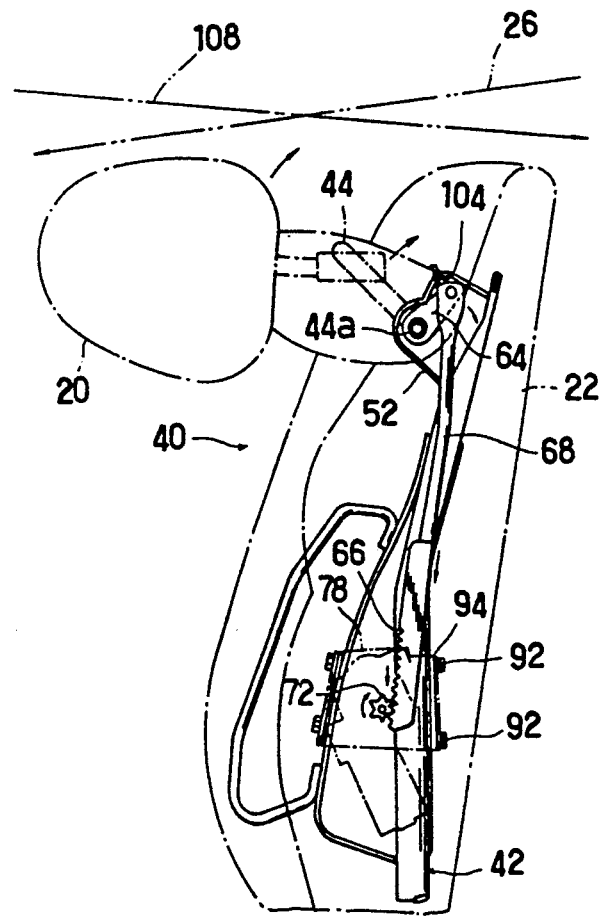
FIG. 6 is a schematic, longitudinally sectional view of the drive mechanism, showing a state where the headrest is located at a non-use position.

Further, as shown in FIGS. 4 and 6, similar to the foregoing holes (100, 102) and elastic member (98), there is formed, at the upper surface of first bearing bracket (52), a through-hole (106) into which is fit secured another elastic member (104) made of urethane rubber material or the like. The second elastic member (98) is also for limiting the upward rotation of the link piece (64), as can be seen from FIG. 6. Namely, when the connecting rod (68) is moved at a maximum level through the foregoing drive mechanism for placing the headrest (20) at the non-use position, the link piece (64)

is rotated upwardly by the connecting rod (58) into contact with the second elastic member (104) and retained there against further upward rotation.

It is noted here that both first and second elastic members (104)(98) are disposed at a point for simultaneously stopping the stopper member (96) and link piece (64) and that the detent edge of the second bearing member (58) is defined at a point where the upper terminal of rack gear part (66) comes down to the pinion gear (72), as seen in FIG. 5, when the headrest (16) reaches the use position.

Figure 9:
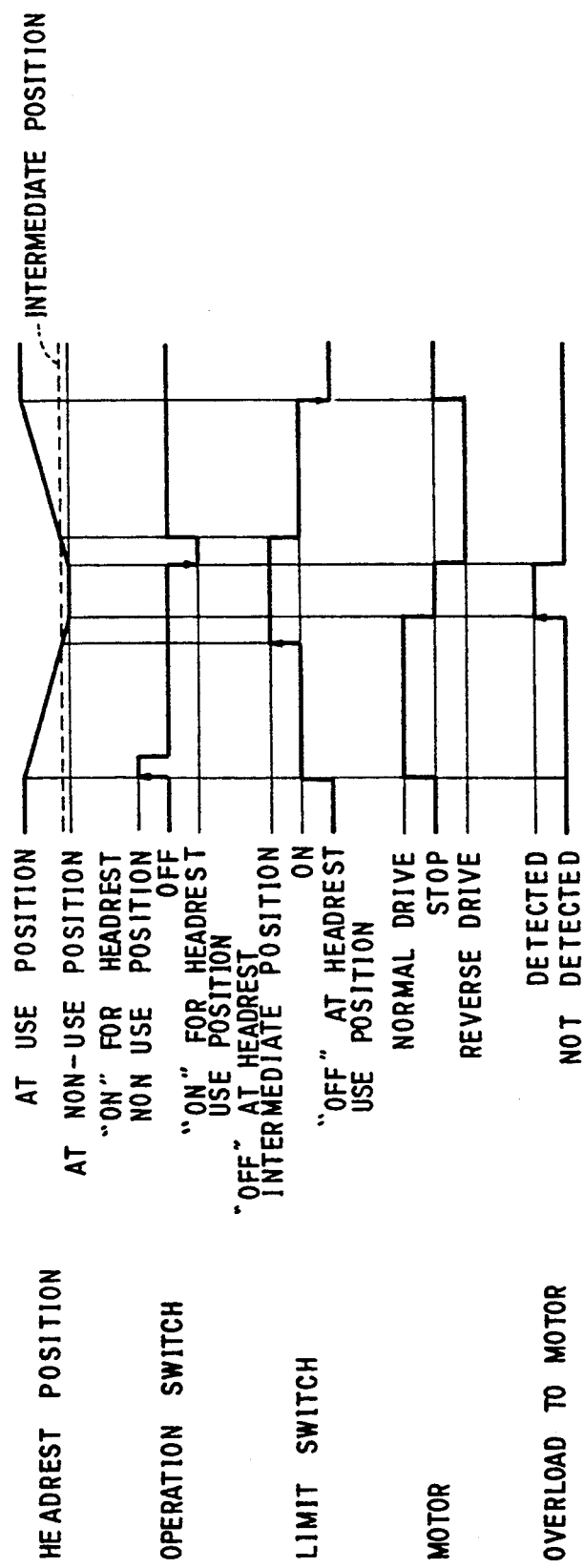
FIG. 9 is a time chart concerning a method for controlling the headrest in accordance with the present invention, which relates to the displacement of headrest from the use position to the non-use position.

Now, with reference to the flow charts in FIGS. 11 and 12 in conjunction with time charts in FIGS. 9 and 10, a description will be made of a method for controlling the headrest (20) with the above-described device (10).

Figure 11:
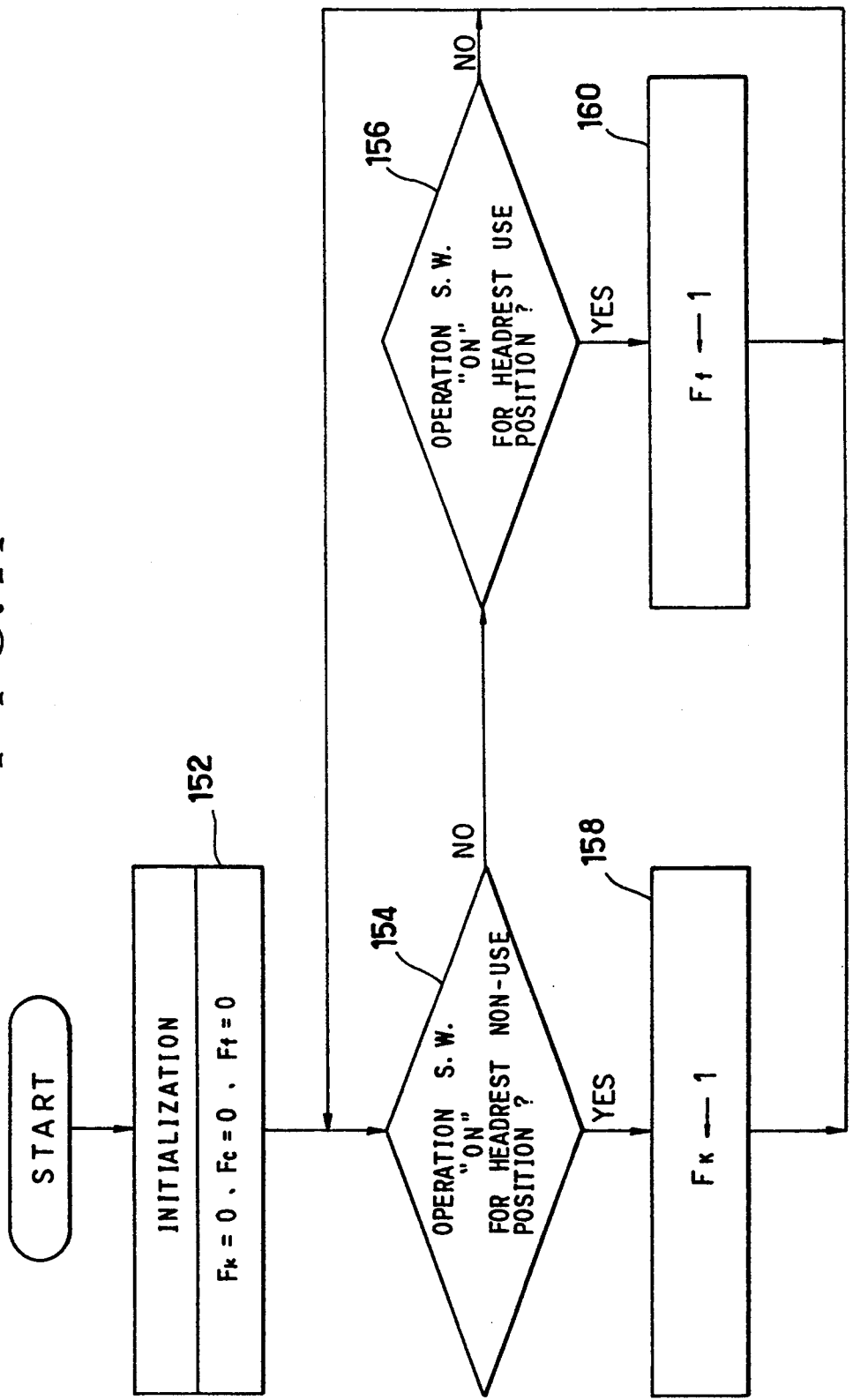
FIG. 11 is a flow chart concerning the method for controlling the headrest, showing specific steps in the headrest control.

Referring to FIG. 11, with switch-on operation, the steps proceeds now with a block (152) for initialization, in which a headrest non-use position instruction flag (Fk) for instructing movement of the headrest (20) towards the non-use position, a headrest return instruction flag (Ff) for instructing return of the headrest (20) to the use position, and a headrest return condition flag (Fc) are all reset to zero level.

Then, at first, the steps is directed to blocks (154)(156), in which it is determined whether the switch (12) is operated for headrest non-use position or not at (154), and whether the same switch (12) is operated for headrest use position or not at (156). As shown in FIG. 9, let us now assume that the headrest (20) is located at the use position and the switch (12) is turned on for the non-use position. Then, At the block (152) in FIG. 11, the answer "YES" is given to set the flag (Fk) (Fk 1) at a block (158) which directs the step to an operation routine (subroutine) in FIG. 12.

Figure 12:
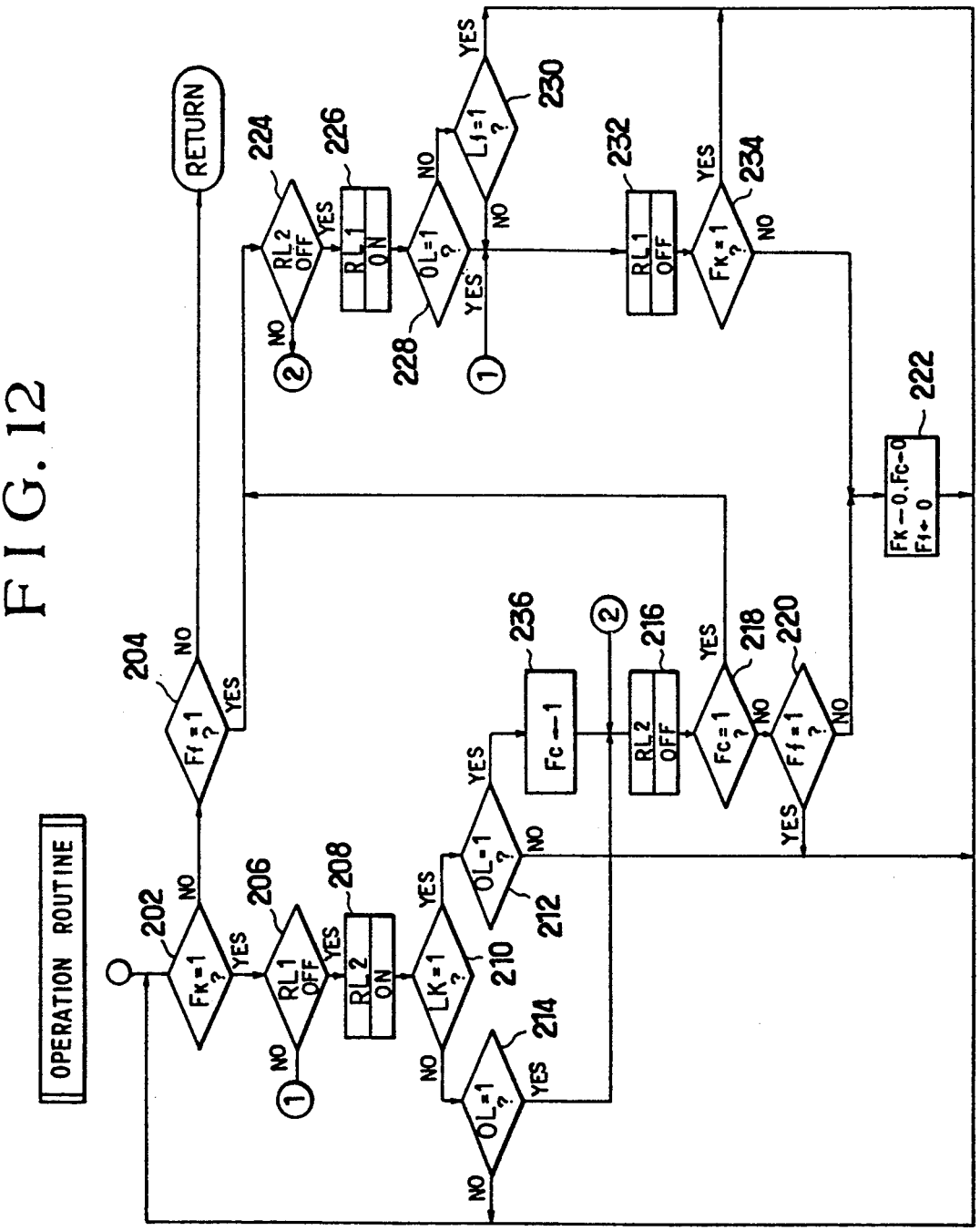
FIG. 12 is a flow chart of an operation routine (sub routine) in connection with the main routine in FIG. 11.

In such operation routine in FIG. 12, at first, it is checked up at (202) whether the flag (Fk) in question is set or not, and at (204) whether the flag (Ff) is set or not. In view of the switch (12) having been turned on for headrest non-use position and thus the flag (Fk) having been set as above, the answer "YES" is decided at the block (202), and the step proceeds to next block (206) in which it is determined whether the first relay (RL1) is deenergized or not. At this point, assuming that the headrest (20) stands at the use position, since the motor (M) is stopped and also that relay (RL1) is deenergized, the "YES" decision is taken at the block (206), and at block (208), an instruction is made to energize the second relay (RL2), whereupon the motor (M) is driven in the normal direction, thereby causing the headrest (20) to be displaced via the abovementioned drive mechanism towards the non-use position (see FIG. 9).

Next, at a block (210), it is decided whether or not an intermediate position limit flag (Lk) is set. In this connection, referring to FIG. 9, the limit switch (14) is turned on at a time prior to the headrest (20) passing by the intermediate position, and therefore, such flag (Lk) is set (Lk=1), thus giving "YES" answer at the block (210). The step goes then to a block (212) for determining whether or not an overload detection flag (OL) is set, in order to ascertain whether the motor (M) is in an overload state. If the motor (M) is driven well, the flag (OL) is in a rest state (OL=0), and thus, "NO" is answered at the block (212), whereupon the motor (M) continues its normal drive (see FIG. 9).

If the headrest (20) is displaced past beyond the intermediate position, the limit switch (14) is turned off, with the result that the flag (Lk) is reset (Lk=0), and "NO" answer is given at the block (210). Then, the motor (M) is placed in an overload state, and the step is led to a block (214) wherein it is determined whether the overload detection flag (OL) is set or not. Now, referring to FIG. 9, if the headrest (20) has reached the non-use position and been limited its movement, and thus the overload state of the motor (M) is detected, the flag (OL) is set and "YES" is given at the block (214) in FIG. 12, whereupon the second relay (RL2) is de-energized as at a block (216), ceasing the drive of motor (M), and the headrest (20) is stopped on the spot.

Next, at a block (218), a determination is made as to whether the headrest return condition flag (Fc) is set (Fc=1?) or not. In view of the flag (Fc) having been reset, "NO" is answered there, and the step goes to a next block (220) for determining whether the headrest return instruction flag (Ff) is set or not (Ff=1?). If such flag was also rest, "NO" is answered there, with the result that, at a block (222), the flags (Fk, Ff, and Fc) are reset to zero.

Turning to FIG. 11, all the flags (Fk, Ff and Fc) are initialized, and turning on the switch (12) for headrest use position leads to the blocks (154) (156), with "NO" and "YES" answers being given at the flock (154) and (156), respectively, thereby setting the flag (Ff) (Ff=1) at (160), thus directing the step flow to the operation routine in FIG. 12.

In FIG. 12, now that the switch (12) is turned on for headrest use position and the flag (Ff) is set, "NO" is given at (202) and "YES" is given at (204). Then, it is checked up at (224) whether the second relay (RL2) is deenergized or not. If the headrest (20) is located at the non-use position as seen in FIG. 9, the answer at (224) in FIG. 12 is "YES", whereby at (226) the motor (M) is driven in the reverse direction so as to cause the headrest (20) to be displaced towards the use position.

Then, during such reverse drive of motor (M), it is checked up at (228) whether the overload detection flag (OL) is set or not. As the motor (M) is driven well, the flag (OL) is in the reset state (OL=0), and thus "NO" is answered at the block (228). The step flow is directed to a block (230) in which it is determined whether an non-use position limit flag (Lf) is set or not (Lf=1?). Here, a negative answer "NO" is retained until the headrest (20) reaches the use position and the motor (M) continues its reverse drive until then. When the headrest (20) reaches the use position, "YES" is answered at that block (230), and the step flow goes to a block (232) wherein an instruction is give to immediately deenergize the first relay (RL1), whereupon the motor (M) is stopped and the headrest (20) is set at the use position. (see FIG. 9)

Then, if the switch (12) is turned for headrest non-use position, it is determined at (234) whether the headrest non-use position instruction flag (Fk) is set or not (Fk=1?), and since the flag is normally in the reset state, the answer will be "NO" there, with the result that the flags (Fk, Ff and Fc) are reset to zero.

Let us now assume that, during reverse drive of the motor (M), namely, during displacement of the headrest (20) toward the use position, the switch (12) is turned on for the headrest non-use position. Then, the flag (Fk) is set (Fk=1), and at the block (202), "YES" is answered, and then "NO" is answered at the next block (206), with the result that at (232) the first relay (RL1) is deenergized, to thereby immediately stop the motor (M). Then, since the flag (Fk) was set, the answer at (234) is "YES", and consequently, the step is returned to the block (202) and proceeds through the blocks (202) (206)

with the affirmative answer "YES" therein. At the block (208), the second relay (RL2) is energized, so that the motor (M) is driven in the normal direction, whereby the return of the headrest (20) to the use position is altered to the displacement of same towards the non-use position.

During the normal drive of motor (M) or during displacement of headrest (20) to the non-use position, if the switch (12) is turned on for the use position, then the flag (Ff) is set (Ff=1), and the step flow is led to the block (204) in which "YES" is answered. Thus, "NO" is decided at (224), and at (216), the second relay (RL2) is deenergized, whereupon the motor (M) is immediately stopped. At this point, the flag (Fc) is in the reset state. Hence, "NO" is decided at (218). Then, in view of the flag (Ff) is set (Ff=1), the block (220) answers "YES". The step flow then passes the block (202) with "NO" answer and proceeds through the blocks (204)(224) with "YES" answers. As a result, at the block (226), the first relay is energized, whereupon the motor (M) is driven in the reverse direction and consequently the displacement of headrest (20) to the non-use position is altered to return of same to the use position.

Figure 10:
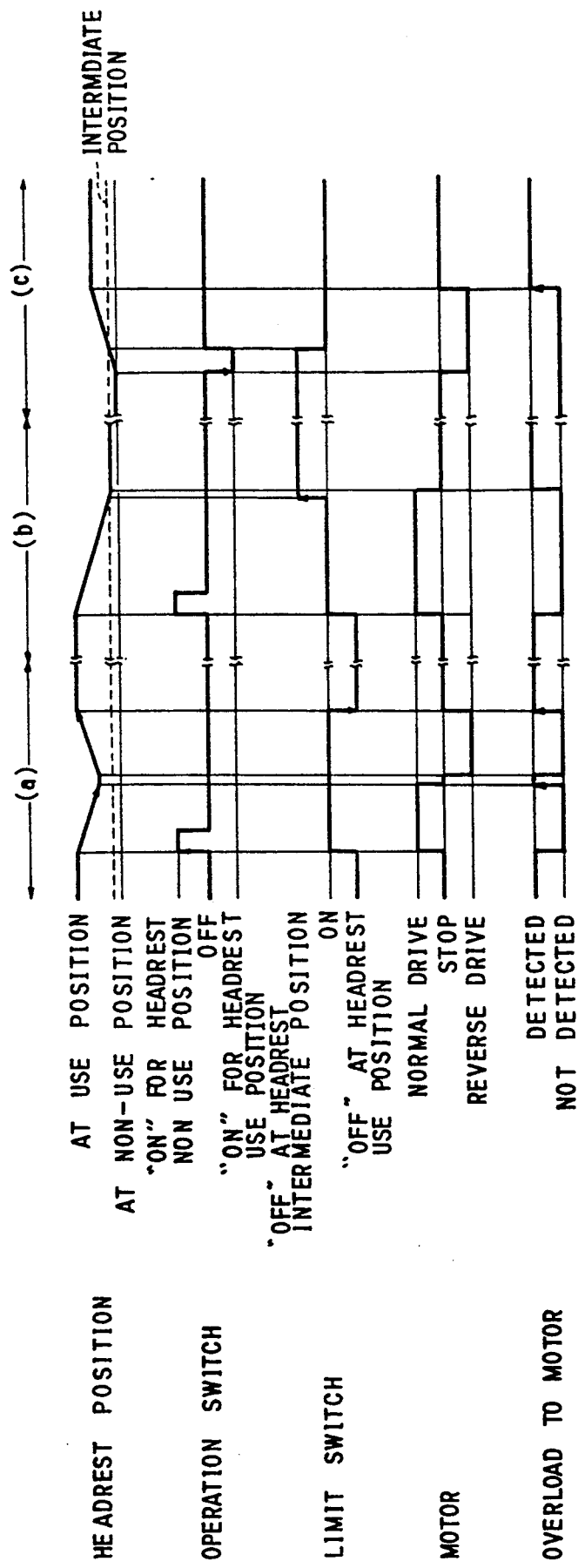
FIG. 10 is a time chart concerning a method for controlling the headrest in accordance with the present invention, which relates to the control of headrest movement mainly between the use and intermediate positions.

Now, looking at FIG. 10, in particular the period section (a) shown therein, let us assume that an overload is applied to the motor (M) in the course of the headrest (20) moving to the non-use position but prior to the headrest (20) reaching the intermediate position, and that the overload state of motor (M) is detected. In such case, since the intermediate position limit flag (Lk) is set (Lk=1) and overload detection flag (OL) is also set (OL=1), "YES" decision is made at both (210)(212) in FIG. 2, as a result of which the headrest return condition flag (Fc) is set (Fc=1) as seen at (236), thereby deenergizing the second relay (RL2) at (216), whereupon the motor is immediately sopped. Then, because of the flag (Fc) having been set, "YES" is decided at (218), and the step flow is led to the block (224) in which it is ascertained whether the second relay (RL2) is deenergized or not; namely whether the motor (M) is stopped or not. If such relay (RL2) is deenergized, the block (224) answers "YES", and then at (226), the first relay (RL1) is energized, so that the motor (M) is driven so as to cause automatical return of the headrest (20) to the use position. (see the designation (a) in FIG. 10)

In FIG. 10, looking at the period section (b) therein, let it be assumed that, in the course of the headrest (20) being displaced to the non-use position and subsequent to the headrest (20) having passed the intermediate position but prior to the same reaching the non-use position, an overload is applied to the motor (M) and the overload state of motor is detected. In that case, since the intermediate position limit flag (Lk) is reset to zero while the overload detection flag (OL) is set (OL=1), turning to FIG. 12, "NO" is answered at the block (210) and "YES" at the block (214), with the result that the second relay (RL2) is deenergized as at (216), whereby the motor (M) is immediately stopped. The step flow is then directed to the block (218) wherein it is determined whether the headrest return condition flag (Fc) is set or not (Fc=1?). At this point, the flag (Fc) is in the reset state (0), and thus the block (218) answers "NO". Then, insofar as the switch (12) is not operated for the use position, "NO" is answered at the block (220), with the result that the flags (Fk, Ff and Fc) are all reset as shown at the block (222).

Accordingly, referring again to the period section (b) in FIG. 10, it is seen that, on its way towards the non-use position, once the headrest (20) has passed the intermediate position, the automatic return of the same to the use position is not effected, even prior to its reaching the non-position, so that the headrest (20) is stopped on the spot and retained there against any further movement. In this instance, since the headrest (20) is stopped in the range between the intermediate and non-use positions, the stopper member (96) is sufficiently pressed against the elastic member (104) and simultaneously the link piece (640 is also pressed against another elastic member (104), whereby no wobbling is created between the headrest (20) and seat back frame (42) and thus it is possible to positively prevent the headrest (20) against unstable dislocation relative to the seat back (22).

Referring still again to the third period section (c) in FIG. 10, it is seen that, if an overload state of motor (M) is detected during the displacement of headrest (20) from the non-use position to the use position, turning to FIG. 12, at the block (228), "YES" is decided, and the step goes to the block (232) in which the first relay (RL1) is deenergized, and the motor is immediately stopped. Accordingly, if the motor (M) is in an overload state during movement of headrest (20) to the use position, the motor (M) will be stopped at any point and retained against further movement.

What is claimed is:

1. A method for controlling a headrest, in which the headrest is adjustably displaced between a generally horizontal non-use position and a generally vertical use position through control of drive of a motor, said method comprising the steps of:

presetting an intermediate position between said non-use position and said use position such that said intermediate position is defined adjacent to said non-use position;

detecting a position of said headrest;

at the same time, checking on whether said motor is in an overload state or not; and effecting a selective control of said motor and headrest displacement such that, if said overload state of motor is detected during displacement of said headrest towards said non-use position at a point between said use and intermediate positions, said motor is caused to be driven in a reverse direction so as to automatically return said headrest to said use position, if said overload state of motor is detected during displacement of said headrest between said intermediate and non-use position, said motor is ceased its drive to cause said headrest to be stopped on the spot and retained there by means of a support means, and if said overload state of motor is detected during return of said headrest to said use position, said motor is ceased its drive at any point, to cause said headrest to be stopped on the spot and retained there.

2. The method as defined in claim 1, wherein said displacement of said headrest in said non-use position, said intermediate position and said use position is detected by use of a limit switch having an arcuate contact on which a limit point for each of said three positions is defined, and wherein a detection terminal is electrically connected with said arcuate contact.

3. A headrest control device comprising:

a headrest which is mounted via a pair of stays on the top of a seat back, said headrest supports the head of an occupant on the seat;

a motor for causing rotative displacement of said headrest between a generally vertical use-position which is defined at said top of seat back and generally horizontal non-use position relative to said seat back;

a switch means for controlling the drive of said motor;

a position detecting means which detects at least said use position and an intermediate position which is defined between said use and non-use positions, wherein said intermediate position is disposed adjacent to said non-use position;

an overload detecting means for detecting an overload state of said motor; and a central processing unit which process an input data according to a predetermined program so as to control the drive of said motor;

whereby a selective control of said motor and headrest displacement is effected such that, if the overload state of said motor is detected during displacement of said headrest towards said non-use position at a point between said use and intermediate positions, said motor is caused to be driven in a reverse direction so as to automatically return said headrest to said use position;

if the overload state of said motor is detected during displacement of said headrest between said intermediate and non-use positions, driving of said motor is ceased to cause said headrest to be stopped on the spot and retained there by means of a support means, and if the overload state of said motor is detected during return of said headrest to said use position, driving of said motor is ceased at any point, to cause said headrest to be stopped on the spot and retained there.

4. A headrest control device according to claim 3 including means for connecting the motor to effective rotative displacement of the headrest, said connecting means comprises a shaft rotatably jorunalled between both lateral sides of the seat back, said shaft is provided with a pair of stay holders for receiving supportively respective pair of stays, and further at its one side is provided with a link;

a connecting rod whose upper end is pivotally connected to said link and whose lower end is formed with a rack gear portion;

a pinion gear which is operatively connected to said motor for rotation and is in a meshed engagement with said rack gear portion of said connecting rod, such that rotation of said pinion gear causes vertical movement of said connecting rod; and a support means which supports said shaft at a pinion between a generally horizontal non-use position of said headrest and an intermediate position defined between said non-use position and a generally vertical use position of said headrest, said support means acting to give a resilient repercussive force to said shaft in a direction towards said use position; and whereby said vertical movement of said connecting rod causes rotation of said link, and responsive to said link rotation, said shaft is rotated to thereby cause rotative displacement of said headrest between said use and non-use positions.

5. The headrest drive mechanism as defined in claim 4, wherein said support means includes:

a stopper member fixed on another side of said shaft, at which said link is not provided, said stopper member extending outwardly from said shaft; and an elastic member disposed between said intermediate and non-use positions so as to pressingly receive said stopper member;

wherein said support means acts to support said headrest at both sides of said shaft in an resilient manner in cooperation with said elastic member.

* * * * *